(No Model.)
D. S. WILLIAMS.
ELECTRIC BATTERY.
No. 552,220. Patented Dec. 31, 1895.
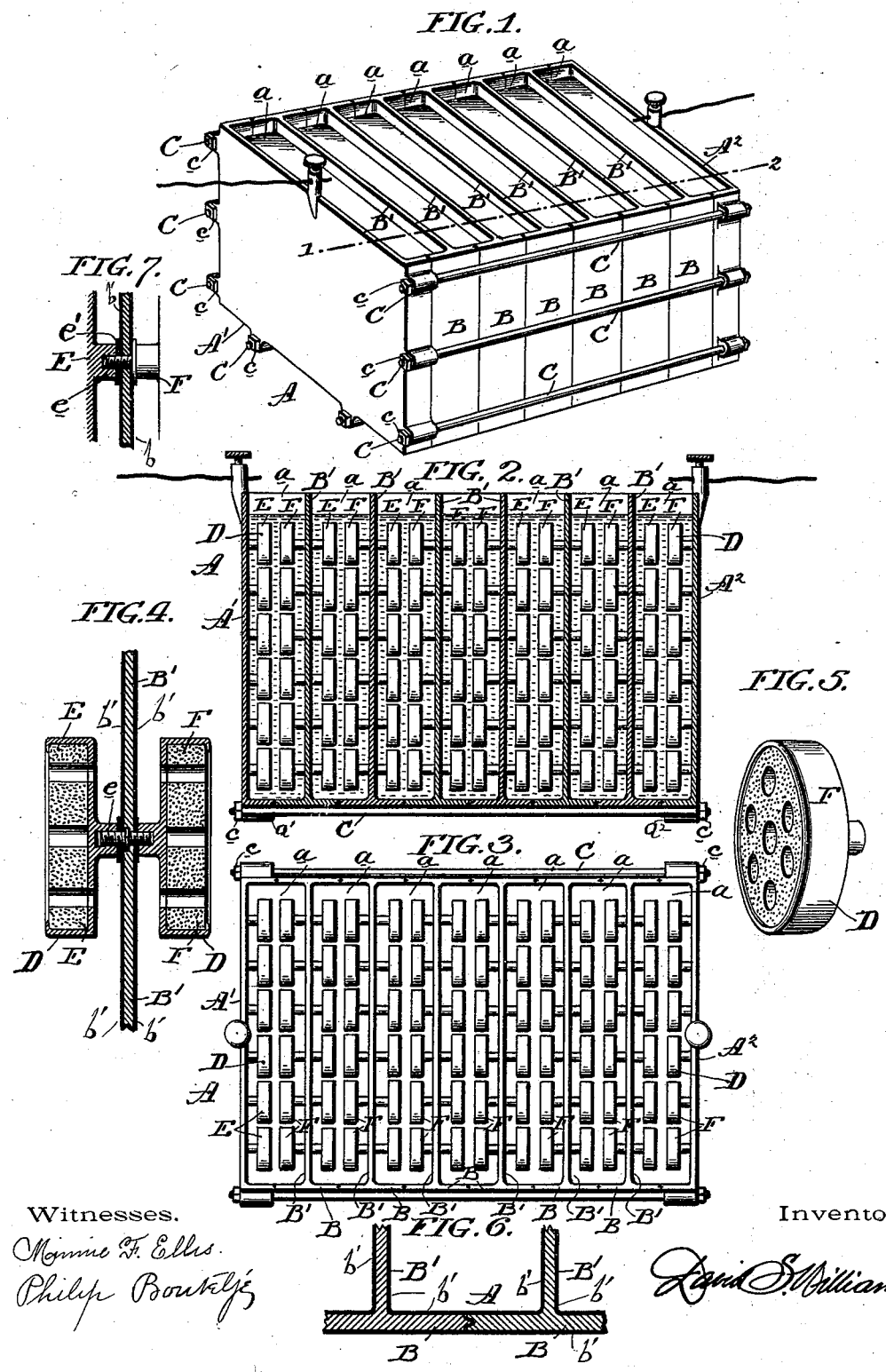
Witnesses.  
Minnie F. Ellis  
Philip Boutelje
Inventor.  
David S. Williams

UNITED STATES PATENT OFFICE.

DAVID S. WILLIAMS, OF PHILADELPHIA, PENNSYLVANIA.

ELECTRIC BATTERY.

SPECIFICATION forming part of Letters Patent No. 552,220, dated December 31, 1895.

Application filed August 23, 1895. Serial No. 560,213. (No model.)

*To all whom it may concern:*

Be it known that I, DAVID S. WILLIAMS, a citizen of the United States, residing at Philadelphia, county of Philadelphia, and State of Pennsylvania, have invented a new and useful Improvement in Electric Batteries, of which the following is a full, clear, and exact description, reference being had to the accompanying drawings, which form a part of this specification.

My invention relates to certain new and useful improvements in electric batteries of the secondary or storage type, and has for its principal object to so construct a battery of this character as to gain an increased voltage without material increase in the size of the cell or containing-vessel of the battery.

In practice it is found that the voltage of a single cell is much too low for lighting and other similar purposes, and to increase the voltage with the ordinary type of battery it is necessary to employ a large number of them, thus requiring a large amount of space and increasing the number of connections to be made and making their use expensive, troublesome, and inconvenient.

To gain the increased voltage in a battery contained in a single casing of comparatively small size I form the casing of sections which when placed together form a number of small chambers, each containing a number of electrodes of opposite polarity and a quantity of the electrolyte to be used. The electrodes are thus arranged in series, and conducting wires leading from said battery are connected with binding-posts which are mounted upon the first and last section of said cell only, thus avoiding a number of separate connections such as must ordinarily be made with a number of cells of the ordinary type.

The sections of which the cell is formed are carefully constructed to prevent leakage, and the electrodes are so constructed and arranged that they will have no tendency to buckle the section to which they are attached. The said electrodes and the active material contained therein have corresponding openings which allow for a free circulation of the electrolyte, which is very essential in a battery of this type.

In the accompanying drawings, Figure 1 represents a perspective view of a secondary or storage battery constructed in accordance with my invention. Fig. 2 is a vertical section on the line 1 2 of Fig. 1. Fig. 3 is a plan view. Fig. 4 is an enlarged vertical section showing the manner of securing the electrodes to each section of the cell. Fig. 5 is a detached perspective view of one of the electrodes. Fig. 6 is an enlarged section of the cell or containing-vessel, showing the manner of uniting the sections comprising the cell together and preventing leakage between said sections; and Fig. 7 is an enlarged vertical section of a modified form of connection for the electrodes.

Referring to the accompanying drawings, $A'$ and $A^2$ represent the opposite ends of the cell A, constructed in accordance with my invention. The cell is divided into a large number of chambers $a$ by partitions $B'$, which form parts of the sections B of which the cell is made up, the whole structure being bound together by bolts C and nuts $c$, both of which are insulated from the end pieces $A'$ and $A^2$ by sleeves $a'$ and $a^2$, as shown in Fig. 2, and if necessary strips of rubber or an acid-proof cement is placed between the sections to prevent any danger of leakage of the electrolyte.

Each of the sections B and partitions $B'$ is preferably made of thin sheet or cast metal having the entire inner and outer surfaces coated with porcelain or other similar non-conducting material $b'$. This imparts great strength to the sections and causes them to resist the disintegrating effect of the electrolyte. Hard rubber, celluloid, or other like material may, however, be used without departing from the spirit of my invention.

In order to avoid any leakage from one chamber to another the partitions $B'$ are cast around the studs $e$, upon which the electrodes E and F are mounted, and the central portion of the studs $e$ are thus tightly embedded in the partitions and all danger of leakage around the studs is prevented; but, if so desired, the studs $e$ may be formed integral with one of the electrodes, as shown in Fig. 7, in which case the stud passing through an opening in partition $B'$ could be made to form a tight joint by means of a rubber washer $e'$, interposed between one of the electrodes and the partition $B'$. The end portions of the studs $e$ are threaded, and to each threaded end is screwed a cup D, adapted to receive and hold the blocks of active material with which the cups D are provided.

The negative electrodes E are formed of disks of peroxide of lead and the positive electrodes F are formed of disks of finely-divided or spongy lead. These disks are formed and treated prior to being assembled in the cups D, after which the flanges of said cups are spun around the outer surfaces of said disks so as to hold them firmly within the cups. Each of these disks has a number of perforations for the purpose of exposing a greater surface area of the electrode to the action of the electrolyte.

The number of studs in each partition depends upon the size of the latter, and they are arranged in line with each other throughout the whole series of partitions. Each stud carries two of the cups, the cup on one side of the partition containing the electropositive material and the cup on the opposite side containing the electronegative material.

As the studs are in the same lines in all the partitions and as a negative and positive electrode face each other in each of the chambers the current generated is conducted by the studs e, the cups and the electrolyte to the studs in the end walls A and A', and through the latter to the binding-posts and conducting-wires leading therefrom. The effect of this series of chambers is equal to the effect produced by a similar number of separate cells, but in the latter case the cells must be connected by a separate wire, and would require a much greater amount of space for the same given power.

With a battery constructed in accordance with my invention space is economized and no connecting-wires are required except those at the end walls of the cell.

Where the entire cell is formed of non-conducting material suitable conducting-plates may be mounted upon the outside of the end walls A and A', to which the binding-posts and conducting-wires may be attached.

Having thus described my invention, what I claim, and desire to secure by Letters Patent, is—

1. An electric battery comprising an outer shell or casing, a series of partitions inactive to the electrolyte dividing the same into a number of chambers, studs of conducting material in said partitions, a negative electrode carried by one end of said stud within one chamber, and a positive electrode carried by the opposite end of said stud within an adjoining chamber.

2. An electric battery comprising an outer shell or casing, a series of partitions, B, inactive to the electrolyte studs, e, carried in said partition, cups, D, on said studs, and electrodes in said cups, substantially as specified.

3. In an electric battery, the combination of the casing having end walls, A, A', partitions, B, inactive to the electrolyte studs, e, in said partitions and end walls, cups, D, carried by said studs, electrodes in said cups, and connecting wires extending from the studs in said end walls, substantially as specified.

4. A secondary battery comprising a series of independent electrodes of opposite polarity in pairs, an electrode of opposite polarity of each pair being in electrical connection, the pairs being supported by partitions inactive to the electrolyte.

5. A secondary battery comprising an outer shell or casing containing the electrolyte divided into a plurality of chambers by partitions inactive to the electrolyte, electrodes in each of said chambers in pairs of opposite polarity, and electrical connection between electrodes of opposite polarity of contiguous chambers.

6. A secondary battery comprising an outer shell or casing containing the electrolyte divided into a plurality of chambers by partitions inactive to the electrolyte, electrodes in each of said chambers in pairs of opposite polarity, and electrical connection between an electrode of opposite polarity, of each pair of electrodes passing through the partition separating said electrodes.

7. A secondary battery comprising an outer shell or casing containing the electrolyte divided into a plurality of chambers by partitions inactive to the electrolyte, electrodes in each of said chambers, studs of conductive material passing through said partitions and forming the support for electrodes of opposite polarity on opposite sides of the partitions.

In testimony of which invention I have hereunto set my hand.

DAVID S. WILLIAMS.

Witnesses:
GEO. W. REED,
PHILIP BOUTELJE.